United States Patent Office 3,151,232
Patented Sept. 29, 1964

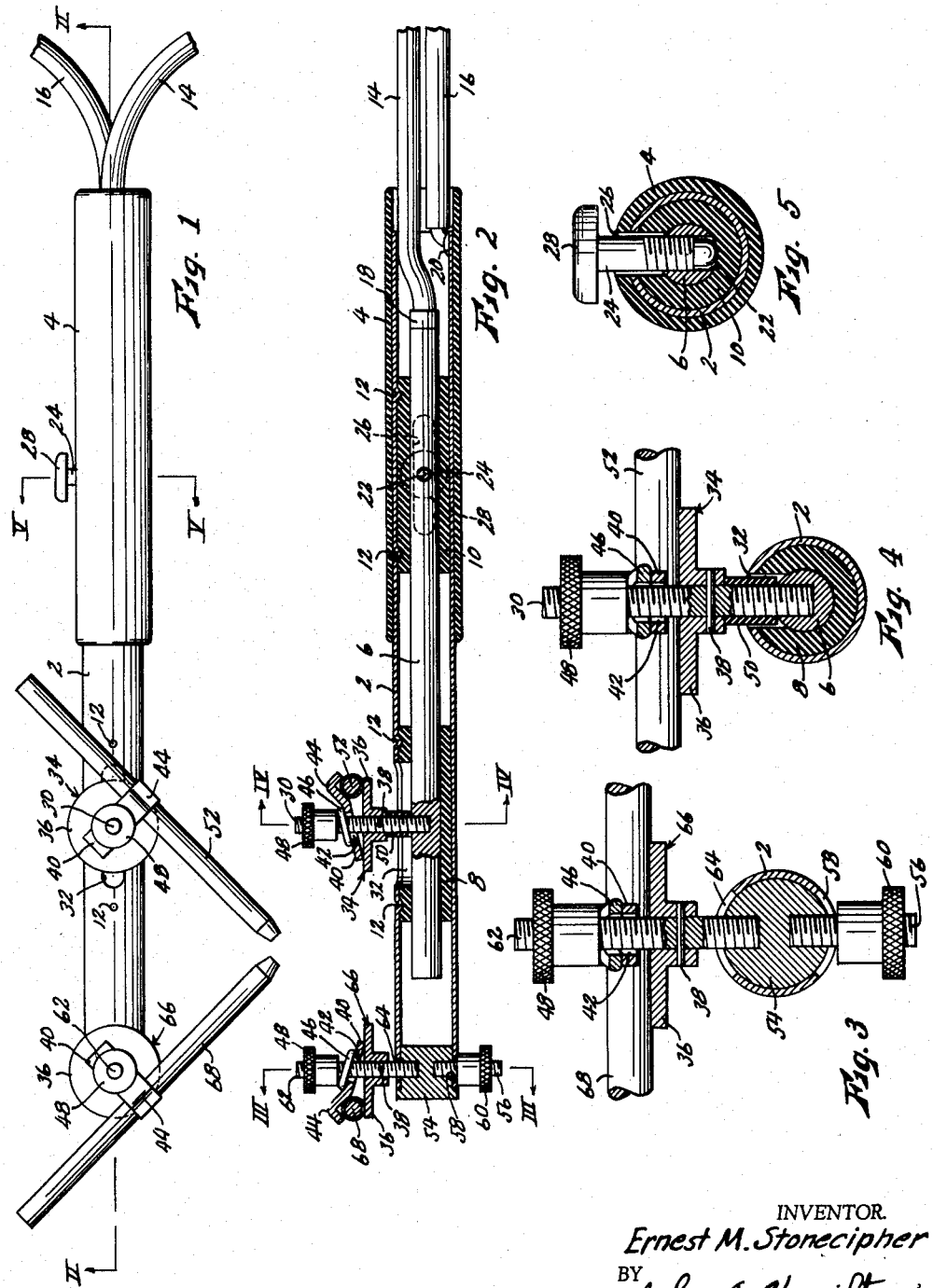

3,151,232
ELECTRIC WELDING TORCH
Ernest M. Stonecipher, P.O. Box 145, Peabody, Kans.
Filed Nov. 22, 1963, Ser. No. 325,598
8 Claims. (Cl. 219—139)

This invention relates to new and useful improvements in electric welding apparatus, and has particular reference to that class of electric welding apparatus commonly known as welding torches.

Electric welding torches consist generally of a pair of arms extending outwardly from an insulated handle, and having an electrode such as a carbon stick mounted at the outer end of each, the arms being relatively adjustable to preserve the necessary spacing of the electrodes, and being connected respectively to the terminals of an electric generator capable of delivering the heavy welding current. However, all previous welding torches within my knowledge have been subject to certain shortcomings and disadvantages. For example, the electrode-holding arms must of course be of conducting material, must be of such length to remove the handle sufficiently far from the welding zone that the operator does not risk burning his hand while manipulating the torch, and must be sufficiently light in weight that manipulation of the torch for long periods of time does not involve undue fatigue to the operator. As a result of these requirements, the arms are usually too fragile to withstand the rough treatment to which such welding torches are customarily subjected, and often become so bent, battered and malformed as to make proper alignment of the electrodes impossible. Also, the close proximity of the arms, and their mounting in a single handle, necessitates electrical insulation therebetween, and such insulating material often must extend along the arms toward the electrodes to such an extent that it is burned and deteriorated by the heat of the welding arc between the electrodes. Also, the means for securing each electrode to its associated arm is necessarily small and light in weight, so that rough handling may deform it to the extent that it cannot hold or grip the electrode in proper alignment with the other electrode.

Accordingly, the principal object of the present invention is the provision of an electric welding torch of the character described in which all of the above enumerated shortcomings and disadvantages are eliminated. Generally, this object is accomplished by the provision of a torch in which one of the electrode-carrying arms is tubular with the other arm telescoped slidably therein to permit relative adjustment of the electrodes longitudinally of the arms, the telescoped assembly greatly increasing the strength and resistance to bending of the arms, by the inclusion of the electrical insulation material in the annular space between the arms whereby it is shielded from the direct heat or the welding arc, by providing gripping devices at the outer ends of said arms for holding the electrodes, said gripping devices permitting extensive relative adjustment of the electrodes held thereby, and by providing adjusting means independent of the gripping means whereby said electrodes may be adjusted by rotation about the axis of the arms to bring them into proper alignment even if the gripping devices should be bent or deformed.

Other objects are simplicity and economy of construction, efficiency and dependability of operation, and adaptability for use in a wide variety of forms and styles differing from the specific torch to be described below.

With these objects in view, as well as other objects which will appear in the course of the specification, reference will be had to the accompanying drawing, wherein:

FIG. 1 is a side elevational view of an electric welding torch embodying the present invention, with a pair of carbon stick electrodes mounted operatively therein, FIG. 2 is a sectional view taken on line II—II of FIG. 1, with parts left in elevation and partially broken away, and with the position of the electrodes slightly changed, FIG. 3 is an enlarged fragmentary sectional view taken on line III—III of FIG. 2, with parts left in elevation, FIG. 4 is an enlarged fragmentary sectional view taken on line IV—IV of FIG. 2, with parts left in elevation, and FIG. 5 is an enlarged sectional view taken on line V—V of FIG. 1.

Like reference numerals apply to similar parts throughout the several views, and the numeral 2 applies to the body member of the welding torch, said body member constituting one of the electrode-carrying "arms" of the torch and being of elongated straight tubular form, and being formed of a strong, light-weight conducting material such as steel or other metal. The rearward portion of said body member is encased in a tubular sheath 4 of insulating material fixed thereover and extending somewhat rearwardly of the body member, said sheath constituting a handle for manually grasping and manipulating the torch. Carried longitudinally and coaxially in body member 2 is a rod 6 which constitutes the second electrode-carrying "arm" of the torch. Said rod is also formed of conducting material, is somewhat shorter than the body member, and is supported for longitudinal sliding movement in the body member by a pair of tubular bushings 8 and 10 disposed respectively adjacent the forward and rearward ends of the rod and being formed of a hard insulating material. The external diameters of said bushings is such that they fit snugly into the body member, and they are affixed in position by indenting the body member as indicated at 12. The internal diameters of the bushings receive rod 6 slidably therein.

A pair of flexible electric cables 14 and 16, the opposite ends of which are adapted to be connected to a suitable electric generator, not shown, extend into the rearward end of body member 2 as best shown in FIG. 2, cable 14 being electrically connected to the rearward end of rod 6 as at 18, and cable 16 being electrically connected to body member 2 adjacent the rearward end thereof as at 20. The flexibility and separation of said cables provides that they will not interfere with the slidability of the rod in the body member.

Adjacent the rearward end of rod 6, between the end limits of bushing 10, an internally threaded bore 22 is formed through said rod, and a screw 24 formed of insulating material is threaded in said bore. One end of said screw extends radially outwardly through a longitudinally elongated slot 26 formed through bushing 10, body member 2 and handle sheath 4, the outer end of said screw being enlarged to form a finger "button" 28. The inner end of screw 24 is rounded as best shown in FIG. 5, so as to abut the inner wall of bushing 10 to lock rod 6 against sliding movement. When the screw is loosened, finger button 28 may be used as a handle for sliding the rod within the body member.

Adjacent the forward end of rod 6, between the end limits of bushing 8, a screw 30 of conducting material is fixed at its inner end in said rod and extends radially outwardly therefrom through a longitudinally elongated slot 32 formed through bushing 8 and body member 2. Said screw is angularly offset from screw 24 by approximately ninety degrees, for a purpose which will presently be described. On the portion of screw 30 extending outwardly from body member 2 is mounted an electrode-gripping device indicated generally by the numeral 34. Said device includes a circular flange member 36 affixed rigidly to the screw as by a lock pin 38, a clamp lever 40 having a hole 42 formed therein adjacent one end thereof fitted loosely over screw 30 and forming an angled jaw 44 at its opposite end, a washer 46 and a knurled nut 48 threaded on the screw, in that order. A sleeve 50 of insulating material is fitted about screw 30 between rod 6 and flange 36 to prevent any possibility that said screw could form a short circuit between rod 6 and body member 2. Flange 36 and clamp lever 40 are of course formed of conducting material. As shown, a welding electrode 52, usually consisting of a straight carbon stick with a coating of copper or the like, is adapted to be clamped between flange 36 and the jaw 44 of clamp lever 40, by tightening nut 48. Thus it will be seen that an electrode of any length and of any diameter over a substantial range may be accommodated, that the electrode may be extended to any desired degree of extension from the gripping device, and that the electrode may be rotatably adjusted to any angle in a plane at right angles to screw 30.

A circular plug 54 of conducting material is fitted for axial rotation in the extreme forward end of body member 2. A screw 56 is fixed in said plug and extends radially outwardly therefrom through a peripherally elongated slot 58 formed in body member 2, having a knurled nut 60 threaded on the extended end thereof. When said nut is loosened, it serves as a handle for turning the plug rotatably in the body member. When the nut is turned to engage the outer surface of the body member, the plug is fixedly secured against rotation. A second screw 62, formed of conducting material, is affixed in plug 54 in diametrically opposed relation to screw 56, and extends radially outwardly therefrom through a second peripherally elongated slot 64 formed in body member 2. On the extended portion of screw 62 is mounted an electrode-gripping device 66 identical in all respects to gripping device 34, corresponding parts being identified by corresponding numerals, and being adapted to grip a second electrode 68 corresponding to electrode 52.

In the use of the welding torch, the electrodes 52 and 68 are mounted in the gripping devices 34 and 66 so as to have the desired angularity to each other and the desired degree of extension from the gripping devices. If the operative ends of the electrodes do not then properly engage when rod 6 is moved forwardly in the body member, nut 60 is loosened and plug 54 is rotated to bring the points of the electrodes into the proper relation. In actual operation, the operator grasps only the insulated handle 4, and utilizes insulated finger button 28 to control the electrodes, first turning said button to free rod 6 for sliding movement, pushing the button forwardly to bring the points of the electrodes into contact to strike the arc, then pushing the button rearwardly to separate the electrode points to provide an arc of the length desired for the particular welding job being performed. As the electrodes are burned away and consumed by the arc, the operator moves the button slowly forwardly to preserve the desired spacing of the electrodes. When desired, the button may again be twisted to cause set screw 24 to clamp rod 6 against movement. All of these operations of finger button 28 may be performed conveniently by the operator using the same hand as that with which he holds handle 4 and manipulates the torch. The 90 degree angular offset between set screw 24 and screws 30 and 62 provides that the electrodes will be positioned properly while finger button 28 is disposed conveniently under the thumb of the operator.

The welding torch as shown has several advantages over any prior apparatus within my knowledge. The telescoping of rod 6 within body member 2, rather than separate side-by-side arms or rods as is customary, provides an extremely strong assembly which is quite unlikely to be bent or deformed by any normal rough handling, but is nevertheless of light weight so that it may be amply long to remove handle 4 and adequately far away from the excessive heat zone of the arc, and still be light enough to operate for long periods of time without undue fatigue. The enclosure of forward insulating bushing 8 within body member 2 protects and shields it effectively from the destructively intense heat of the arc. The electrode-gripping devices 34 and 66 are extremely flexible in permitting use of electrodes of different lengths, different diameters, and at different operating angles, and will normally hold the two electrodes accurately in co-planar relation so that the points thereof meet properly. If the gripping device should become damaged or deformed so as to fail to hold the points of the electrodes in proper relation, as by bending of screws 30 or 62 or flanges 36 due to rough handling, this does not affect the ability of the gripping device to hold the electrodes firmly, and the points of the electrodes may be returned to their proper relative positions by rotating plug 54 adjustably in the body member.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An electric welding torch comprising:
    (a) an elongated tubular body member of electrical conducting material,
    (b) a rod of electrical conducting material disposed coaxially and entirely within said body member for longitudinal sliding movement therein,
    (c) means insulating said body member from said rod,
    (d) means for connecting said body member and said rod respectively to the terminals of a source of electric power,
    (e) means for manually sliding said rod in said body member,
    (f) an insulated handle affixed to one end of said body member,
    (g) a first elongated mounting member carried at the opposite end of said body member and extending angularly therefrom,
    (h) a second mounting member affixed to said rod within said body member in spaced relation from said first mounting member, and extending outwardly from said body member through a longitudinally elongated slot formed therein, and
    (i) an electrode-gripping device carried at the outer end of each of said mounting members.

2. An electric welding torch as recited in claim 1 wherein said means insulating said rod from said body member is encased within said body member, whereby it is shielded from the heat generated between the electrodes mounted in said gripping devices.

3. An electric welding torch as recited in claim 1 wherein said rod has a diameter substantially smaller than the internal diameter of said body member, whereby to provide an annular space therebetween, and wherein said means insulating said rod from said body member consists of a plurality of tubular bushings of insulating material affixed in said body member in longitudinally spaced apart relation and having said rod slidably mounted in the internal bores thereof.

4. An electric welding torch as recited in claim 1 wherein said handle consists of a sheath of insulating material extending over a portion of the length of said body member and affixed thereto, and wherein said means for sliding said rod in said body member consists of an elongated operating member of insulating material secured at its inner end in said rod and extending radially outwardly therefrom through a longitudinally elongated slot formed through said body member and said handle sheath.

5. An electric welding torch as recited in claim 4 wherein said electrode-gripping devices position the electrodes gripped thereby in a plane parallel to said body member, and wherein said operating member is parallel to the plane of said electrodes.

6. An electric welding torch as recited in claim 4 wherein said operating member is threaded in a hole formed diametrically in said rod, whereby said operating member may be turned to abut the inner end thereof against the interior of said body member, thereby to secure said rod releasably against sliding movement in said body member.

7. An electric welding torch as recited in claim 1 with the addition of:
   (a) a plug carried for axial rotation in the end of said body member opposite said handle, the inner end of said first mounting member being secured in said plug whereby said first mounting member may be turned relatively to said second mounting member about the axis of said body member, and
   (b) means for releasably securing said plug against rotation in said body member at any desired angular adjustment.

8. An electric welding torch as recited in claim 1 wherein each of said electrode-gripping devices comprises:
   (a) a circular flange affixed concentrically to the associated mounting member in outwardly spaced relation from said body member,
   (b) a nut threaded on said mounting member outwardly from said flange for movement toward said flange, and
   (c) an elongated clamp lever having a hole formed therethrough adjacent one end thereof engaged loosely and rotatably over said mounting member intermediate said flange and said nut, the opposite end of said lever extending adjacent the periphery of said flange and forming a jaw opening toward said flange, whereby an electrode may be gripped between said flange and said jaw.

References Cited in the file of this patent
UNITED STATES PATENTS

| | | |
|---|---|---|
| 2,425,830 | Ross | Aug. 19, 1947 |
| 2,466,886 | Frade | Apr. 12, 1949 |